US010915964B1

(12) United States Patent
Purgatorio et al.

(10) Patent No.: US 10,915,964 B1
(45) Date of Patent: Feb. 9, 2021

(54) SYSTEM AND METHOD FOR PROVIDING VEHICLE SERVICES BASED ON DRIVING BEHAVIORS

(71) Applicant: Allstate Insurance Company, Northbrook, IL (US)

(72) Inventors: Ginger Purgatorio, Algonquin, IL (US); Gina M. Minick, Evanston, IL (US); Orlando E. Mercado, Rolling Meadows, IL (US)

(73) Assignee: Allstate Insurance Company, Northbrook, IL (US)

( * ) Notice: Subject to any disclaimer, the term of this patent is extended or adjusted under 35 U.S.C. 154(b) by 630 days.

(21) Appl. No.: 14/636,979

(22) Filed: Mar. 3, 2015

(51) Int. Cl.
*G06Q 40/08* (2012.01)
*G06Q 30/02* (2012.01)

(52) U.S. Cl.
CPC ......... *G06Q 40/08* (2013.01); *G06Q 30/0226* (2013.01)

(58) Field of Classification Search
CPC .......... G09B 19/16; G08G 1/00; G06Q 40/00; G06Q 40/08; G06Q 30/0226; G06F 17/00
USPC ............... 705/4, 7.32, 14.62, 13; 455/404.2; 434/65
See application file for complete search history.

(56) References Cited

U.S. PATENT DOCUMENTS

| 6,711,474 | B1 | 3/2004 | Treyz et al. |
| 8,160,952 | B1* | 4/2012 | Fell ........................ G06Q 30/06 705/26.1 |
| 8,255,275 | B2 | 8/2012 | Collopy et al. |
| 8,466,781 | B2 | 6/2013 | Miller et al. |
| 8,549,318 | B2 | 10/2013 | White et al. |
| 8,577,703 | B2 | 11/2013 | McClellan et al. |
| 8,731,974 | B2 | 5/2014 | Pandhi et al. |
| 9,615,213 | B2* | 4/2017 | Tibbitts ................... B60T 8/172 |
| 10,445,758 | B1* | 10/2019 | Bryer ................. G06Q 30/0207 |

(Continued)

FOREIGN PATENT DOCUMENTS

| WO | 2010095119 A1 | 8/2010 |
| WO | 2013134863 A1 | 9/2013 |

OTHER PUBLICATIONS

Panos Desyllas and Mari Sako. Profiting from Business Model Innovation: Evidence from Pay-as-You-Drive Auto Insurance. Jan. 2013. ResearchGate. pp. 101-104 (Year: 2013).*

(Continued)

Primary Examiner — Christopher Bridges
Assistant Examiner — Tony P Kanaan
(74) Attorney, Agent, or Firm — Banner & Witcoff, Ltd.

(57) ABSTRACT

Systems and methods are provided for encouraging and rewarding safe driving. A safe driving evaluation system determines the safe driving behaviors necessary to earn safe driving points. The safe driving evaluation system receives vehicle telematics data from a telematics device configured to obtain vehicle telematics data during the operation of a vehicle, and determines safe driving points based on the safe driving behaviors exhibited by the vehicle telematics data. Safe driving rewards are provided where the total number of safe driving points earned by a driver exceeds predefined thresholds. The safe driving rewards may be redeemed for discounts on products or vehicle services, or for fixed prices on gas. In addition, the safe driving points may be transferred to another individual for redemption.

20 Claims, 7 Drawing Sheets

(56) References Cited

U.S. PATENT DOCUMENTS

| | | | |
|---|---|---|---|
| 10,565,593 B1* | 2/2020 | Aabram | G07F 17/0014 |
| 10,692,149 B1* | 6/2020 | Loo | G06Q 40/08 |
| 2002/0178033 A1* | 11/2002 | Yoshioka | G06Q 40/08 |
| | | | 705/4 |
| 2008/0243558 A1 | 10/2008 | Gupte | |
| 2008/0302872 A1* | 12/2008 | Tate | G06Q 30/02 |
| | | | 235/462.07 |
| 2011/0040579 A1* | 2/2011 | Havens | G06Q 10/08 |
| | | | 705/4 |
| 2011/0106370 A1 | 5/2011 | Duddle et al. | |
| 2012/0041675 A1 | 2/2012 | Juliver et al. | |
| 2012/0066007 A1* | 3/2012 | Ferrick | G06Q 30/0283 |
| | | | 705/4 |
| 2012/0185282 A1 | 7/2012 | Gore et al. | |
| 2013/0197973 A1 | 8/2013 | Liu et al. | |
| 2013/0238439 A1 | 9/2013 | Chatterjee et al. | |
| 2013/0316311 A1* | 11/2013 | England | G09B 19/167 |
| | | | 434/65 |
| 2013/0332004 A1 | 12/2013 | Gompert et al. | |
| 2014/0032297 A1 | 1/2014 | Germann et al. | |
| 2014/0195272 A1 | 7/2014 | Sadiq et al. | |
| 2014/0278840 A1* | 9/2014 | Scofield | G07C 5/008 |
| | | | 705/13 |
| 2016/0086285 A1* | 3/2016 | Jordan Peters | G08G 1/096827 |
| | | | 705/4 |
| 2016/0129913 A1* | 5/2016 | Boesen | B60W 40/09 |
| | | | 705/4 |
| 2016/0150070 A1* | 5/2016 | Goren | H04W 48/04 |
| | | | 455/404.2 |
| 2016/0171521 A1* | 6/2016 | Ramirez | G06Q 10/0635 |
| | | | 701/409 |

OTHER PUBLICATIONS

Drivescribe "Smart driving is now rewarding" Peace of mind included, Retrieved Aug. 2012, http://drivescribe.com/wp-content/uploads/2012/08/DriveScribePRessKit_for-web.pdf.

Auto Insurance Coverage & Car Insurance Quotes Allstate, "When You're in the Car, We've Got You Covered", Retrieved Oct. 13, 2014, http://www.allstate.com/auto-insurance/auto-insurance-coverage-options.aspx.

Auto Insurance Texas—Texas Teen Driving Resources, Retrieved Oct. 13, 2014, http://www.texasinsuranceprovider.com/Auto_Insurance_Texas_Teen_Driver.html.

Carrot Car Insurance, How it Works, Retrieved Oct. 13, 2014, http://www.carrotinsurance.com/HowItWorks.aspx.

Better drivers pay less for car insurance with Snapshot Usage-Based Insurance program from Progressive, Retrieved Oct. 13, 2014, http://www.progressive.com/newsroom/article/2013/december/tennessee-snapshot-discount/.

Strategies to sustain good driving behavior in the long-run: Part 3, fleetanswers.com, Retrieved Oct. 13, 2014, http://fleetanswers.com/content/strategies-sustain-good-driving-behavior-long-run-part-3.

* cited by examiner

SYSTEM AND METHOD FOR PROVIDING VEHICLE SERVICES BASED ON DRIVING BEHAVIORS

BACKGROUND

Insurance companies value the safety of drivers and the general public. Accordingly, rewarding safe driving behaviors is a matter of good policy. Although techniques exist to generally encourage safe driving, they might not provide a mechanism whereby drivers may earn rewards for engaging in safe driving behaviors, where the rewards are redeemable for vehicular services. Further, these techniques might not provide for non-insured drivers with the incentives to engage in safe driving behaviors.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides a safe driving evaluation system. The safe driving evaluation system may include at least one processor. The safe driving evaluation system may be configured to, in operation, receive, from a telematics device, vehicle telematics data associated with a vehicle, select a set of safe driving behaviors, and determine a number of safe driving points based, at least in part, on a comparison of the vehicle telematics data to at least one of the safe driving behaviors. Based, at least in part, on the number of safe driving points, the safe driving evaluation system may be configured to, in operation, determine a safe driving reward, and provide the safe driving reward to an individual associated with the vehicle. The individual may be an insurance customer or a non-insurance customer.

A second aspect described herein provides a gas pump. The gas pump may include at least one processor, and an input device, and a gas dispenser configured to, in operation, dispense gas at a first price. The gas pump may be configured to, in operation, receive, via the input device, an indication of a safe driving reward amount, determined for a safe driving reward, validate a set of restrictions associated with the safe driving reward, determine a second price lower than the first price based, at least in part, on the safe driving reward amount, and dispense gas to the vehicle at the second price.

A third aspect described herein provides a computer-assisted method of rewarding safe driving behaviors. A special-purpose computing system may receive, from a telematics device, at a safe driving evaluation system, vehicle telematics associated with a vehicle, select a set of safe driving behaviors, and determine a number of safe driving points based, at least in part, on a comparison of the vehicle telematics data to at least one of the safe driving behaviors. Further, the special-purpose computing system may determine a safe driving reward based, at least in part, on the number of safe driving points, and provide the safe driving reward to an individual associated with the vehicle. The individual may be an insurance customer or a non-insurance customer.

The details of these and other aspects of the disclosure are set forth in the accompanying drawings and description below. Other features and advantages of aspects of the disclosure will be apparent from the description and drawings.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Aspects of the present disclosure are directed toward a safe driving points acquisition system. The safe driving points acquisition system collects and analyzes vehicle telematics data during operation of a vehicle, and accumulates safe driving points for the driver when the driver engages in safe driving behaviors. The safe driving points acquisition system allows the driver to both redeem and transfer the safe driving points to other individuals. Thus, subject to any applicable regulations, individuals may be provided reward points for engaging in safe driving behaviors. The drivers may be insurance customers or non-insurance customers.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof, as well as additional items and equivalents thereof. As used in this description, a set refers to a collection of one or more elements. As used in this description, a driver, as used in the description, refers to any individual operating a vehicle. The individual may or may not hold a fully qualified driver's license. The individual may or may not hold an insurance policy.

Figure 1:
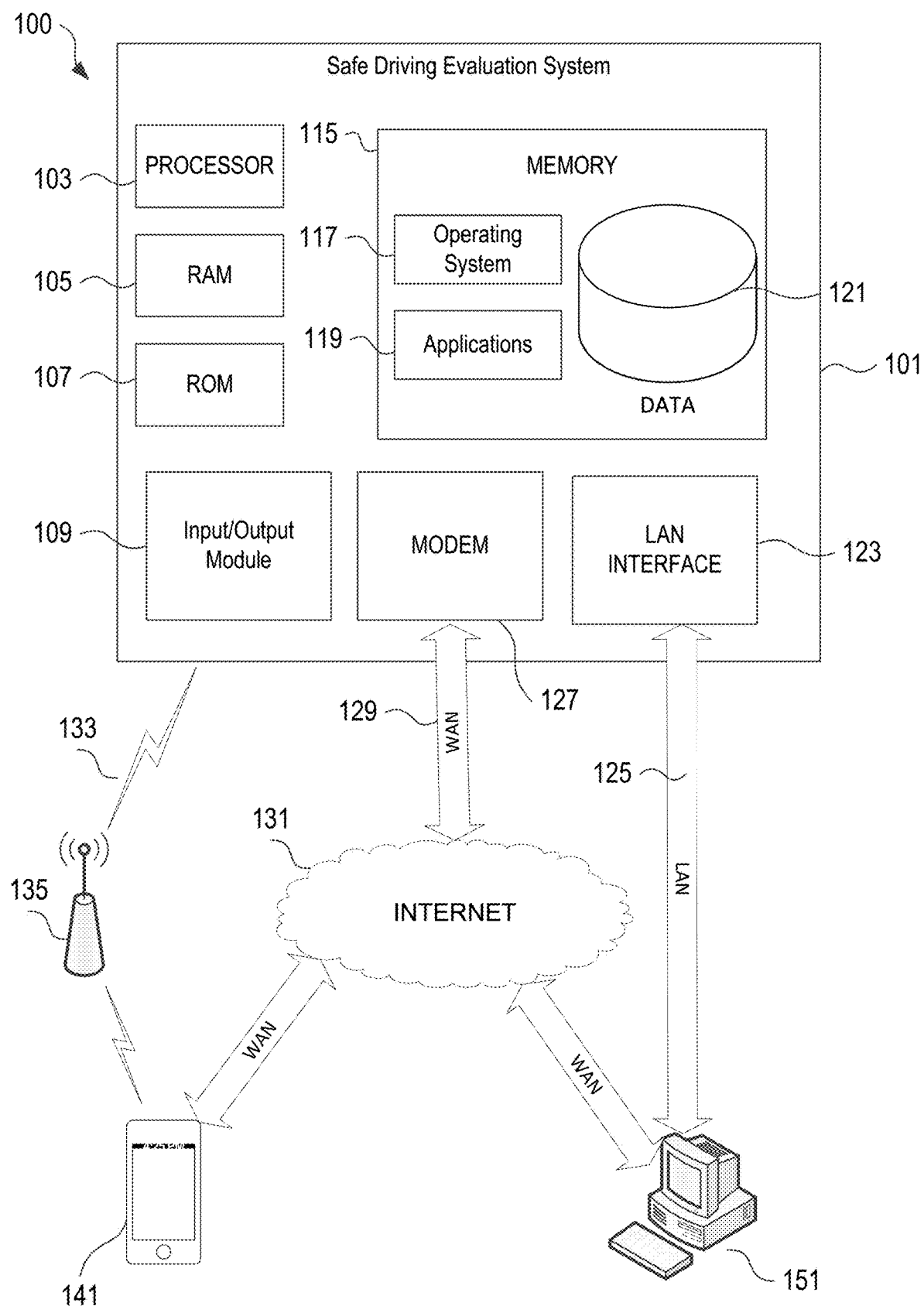
FIG. 1 illustrates a network environment in which a safe driving points acquisition system may be implemented.

FIG. 1 illustrates a block diagram of a safe driving evaluation system 101 in a safe driving points acquisition system 100 that may be used according to one or more illustrative embodiments of the disclosure. The safe driving evaluation system 101 may have a processor 103 for controlling overall operation of the safe driving evaluation system 101 and its associated components, including RAM 105, ROM 107, input/output unit 109, and memory 115. The safe driving evaluation system 101, along with one or more additional devices (e.g., terminals 141, 151) may correspond to one or more special-purpose computing devices, such as safe driving points acquisition computing devices or systems, configured as described herein for collecting and analyzing vehicle telematics data, providing a driver with safe driving points for engaging in safe driving behaviors, issuing rewards based on the safe driving points, allowing the driver to redeem the rewards, and allowing the driver to transfer the safe driving points to other individuals. Vehicle telematics data includes data received from one or more telematics devices, vehicle sensors, or vehicle subsystems and then transmitted to a system or device located remotely relative to the vehicle. Vehicle telematics data may also include data received from a mobile computing device or a third-party telematics system.

Input/Output (I/O) devices 109 may include a microphone, keypad, touch screen, and/or stylus through which a user of the safe driving evaluation system 101 may provide input, and may also include one or more of a speaker for providing audio output and a video display device for providing textual, audiovisual and/or graphical output. Software may be stored within memory 115 and/or storage to provide instructions to processor 103 for enabling safe driving evaluation system 101 to perform various functions. For example, memory 115 may store software used by the safe driving evaluation system 101, such as an operating system 117, application programs 119, and an associated internal database 121. Processor 103 and its associated special-purpose computing devices may allow the safe driving points evaluation system 100 to execute a series of computer-readable instructions to collecting and analyze vehicle telematics data, providing safe driving points, issuing rewards based on the safe driving points, and allowing redemption of the rewards.

The safe driving evaluation system 101 may operate in a networked environment 100 supporting connections to one or more remote computers, such as terminals/devices 141 and 151. The safe driving evaluation system 101, and related terminals/devices 141 and 151, may be in signal communication with special-purpose devices installed in vehicles, special-purpose mobile special-purpose computing devices that may travel within vehicles, or special-purpose devices outside of vehicles that are configured to receive and process vehicle telematics data. Thus, terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the safe driving evaluation system 101.

The network connections depicted in FIG. 1 include a local area network (LAN) 125 and a wide area network (WAN) 129, and a wireless telecommunications network 133, but may also include other networks. When used in a LAN networking environment, the safe driving evaluation system 101 may be connected to the LAN 125 through a network interface or adapter 123. When used in a WAN networking environment, the safe driving evaluation system 101 may include a modem 127 or other means for establishing communications over the WAN 129, such as network 131 (e.g., the Internet). When used in a wireless telecommunications network 133, the safe driving evaluation system 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices described herein may be configured to communicate using any of these network protocols or technologies.

Additionally, one or more application programs 119 used by the safe driving evaluation system 101 may include computer executable instructions (e.g., instructions for vehicle telematics data collection and analysis programs, safe driving points calculation programs, reward issuing programs, and reward redemption programs,) for collecting and analyzing vehicle telematics data associated with a vehicle, providing safe driving points to an individual, issuing rewards based on the safe driving points, allowing the driver to redeem the rewards, and allowing the individual to transfer the safe driving points to another individual.

Figure 2:
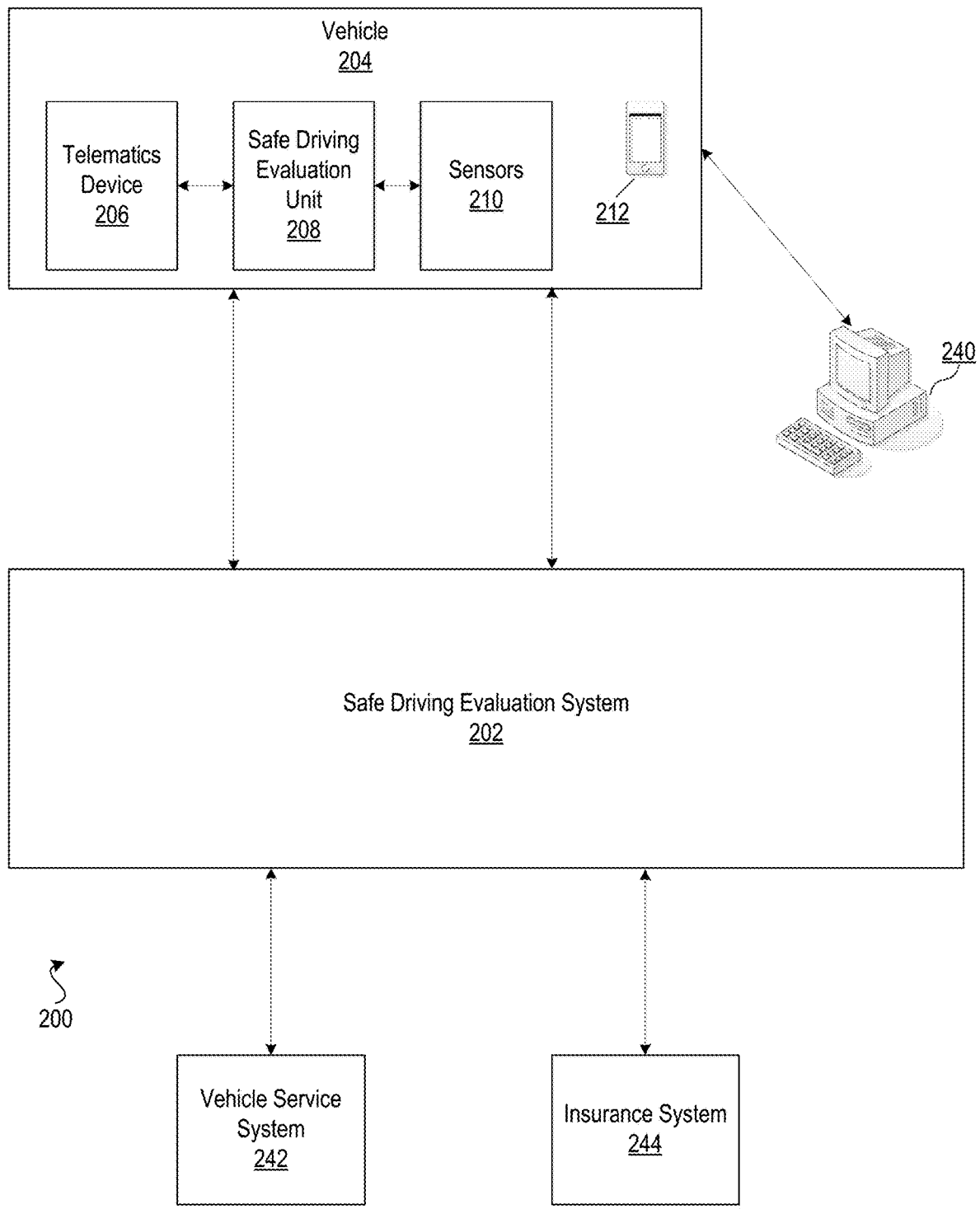
FIG. 2 is a block diagram illustrating various components and devices associated with an example safe driving points acquisition system, according to one or more aspects of the disclosure.

FIG. 2 is an illustration of an example implementation of a safe driving points system 200. The system 200, in this example, includes a safe driving evaluation system 202. The safe driving evaluation system 202, described in further detail below, provides safe driving points to a driver for engaging in safe driving behaviors. The safe driving points evaluation system 202 determines whether a driver has engaged in safe driving behaviors based on vehicle telematics data. Vehicle telematics data, as used in this description, refers to how a driver operates a vehicle with respect to, e.g., accelerating, decelerating, braking, turning, signaling, lane usage, adequate vehicle spacing, speed, distraction management, and other driving-related operations performed by the driver at the vehicle. A vehicle telematics device may be installed at, attached to, or in signal communication with a vehicle or various systems or components of the vehicle.

The safe driving evaluation system 202 may contain some or all of the hardware/software components as the safe driving evaluation system 101 depicted in FIG. 1. The safe driving evaluation system 202 is a special-purpose computing device that is configured to receive vehicle driving data from one or more vehicles 204, such that information may be received (i) from telematics devices installed at and attached to the vehicle, (ii) from telematics devices located in the vehicle during its operation (e.g., at a mobile special-purpose computing device), or (iii) from special-purpose computing devices located remotely relative to the vehicle that received the vehicle telematics data "from the vehicle" as described in (i) or (ii). The safe driving evaluation system 202 is also configured to send and receive data to and from a vehicle service system 242 (e.g., gas station and/or pump system, a towing facility or vehicle system, auto repair shop system, roadside assistance system, etc.), a third-party system 244 (e.g., an insurance system, a fleet management system, etc.), and other systems associated with the vehicle operation and maintenance. The safe driving evaluation system 202 may initiate communication with or retrieve driving data from a vehicle 204 wirelessly via telematics devices 206, or by way of separate computing systems (e.g., computer 240) over one or more computer networks (e.g., the Internet). The safe driving evaluation system 202 may also be configured to receive telematics data from one or more third-party telematics systems. Additionally, the safe driving evaluation system 202 may receive additional data relevant to safe driving behaviors from other non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet and hail amounts, temperatures, wind, road conditions, visibility, etc.) at various times and locations, and other external data sources containing driving hazard data (e.g., road hazards, traffic accidents, downed trees, power outages, construction zones, school zones, and natural disasters, etc.).

In some examples, the safe driving evaluation system 202 may acquire information about a vehicle directly from the vehicle 204, where the vehicle telematics data may be generated at the vehicle 204 itself. The vehicle 204 may be, for example, an automobile, motorcycle, scooter, bus, recreational vehicle, boat, bicycle, or other vehicle for which a vehicle telematics data may be collected and analyzed, and for which as associated driver may be provided safe driving points. The vehicle 204 may include one or more sensors 210, which are capable of detecting and recording various conditions at the vehicle and operating parameters of the vehicle. For example, the sensors 210 may detect, transmit, or store data corresponding to the vehicle's location (e.g., GPS coordinates), speed and direction, rates of acceleration, deceleration, or braking, and specific instances of sudden acceleration, braking, and swerving. The sensors 210 may also detect, transmit, or store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 210 may detect and store the external driving conditions, for example, external temperature, rain, snow, light levels, and sun position for driver visibility. Additional sensors 210 may also detect and store data relating to compliance with traffic laws and the observance of traffic signals and signs. Additional sensors 210 may further detect and store data relating to the maintenance of the vehicle 204, such as the engine status, oil level, engine coolant temperature, odometer reading, the level of fuel in the fuel tank, engine revolutions per minute (RPMs), tire pressure, or combinations thereof.

The vehicle may also include cameras or proximity sensors 210 capable of recording additional conditions inside or outside of the vehicle 204. For example, internal cameras 210 may detect conditions such as the number of passengers and the types of passengers (e.g., adults, children, teenagers, handicapped, etc.) in the vehicles, and potential sources of driver distraction within the vehicle (e.g., pets, phone usage, unsecured objects in the vehicle). Sensors 210 also may be configured to collect data a driver's movements or the condition of a driver. For example, the vehicle 204 may include sensors 210 that monitor a driver's movements, such as the driver's eye position and/or head position, etc. Additional sensors 210 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer. Further, the vehicle 204 may include sensors 210 that capable of detecting other nearby vehicles, traffic levels, road conditions, traffic obstructions, animals, cyclists, pedestrians, and other conditions that may factor into an analysis of vehicle telematics data. Certain vehicle sensors 210 also may collect information regarding the driver's route choice, whether the driver follows a given route, and to classify the type of trip (e.g., commute, errand, new route, etc.). A Global Positioning System (GPS), locational sensors positioned inside the vehicle 214, and/or locational sensors or devices external to the vehicle 214 may be used determine the route, trip type (e.g., commute, errand, new route, etc.), lane position, and other vehicle position or location data.

The data collected by the vehicle sensors 210 may be stored or analyzed within the respective vehicle 204, or may be transmitted to one or more external devices. For example, as shown in FIG. 2, sensor data may be transmitted to a safe driving evaluation unit 208, which may be a collection of special-purpose computing device that are interconnected and in signal communication with each other. The special-purpose computing devices may be programmed with a particular set of instructions that, when executed, perform functions associated with using vehicle telematics data to reward drivers for engaging in safe driving behaviors. As such, a safe driving evaluation unit 208 may be a separate special-purpose computing device or may be integrated into one or more components within the vehicle 204, such as the telematics device 206, or in the internal computing systems of the vehicle 204. Additionally, the sensor data may be transmitted as vehicle telematics data via a telematics device 206 to one or more remote computing devices, such as a safe driving evaluation system 202. A telematics device 206 may be a computing device containing many or all of the hardware/software components as the safe driving evaluation system 101 depicted in FIG. 1. As discussed above, the telematics device 206 may receive vehicle telematics data from vehicle sensors 210, and may transmit the data to one or more external computer systems (e.g., driving license evaluation system 202 of an insurance company, financial institution, or other entity) over a wireless transmission network. Telematics devices 206 also may be configured to detect or determine additional types of data relating to real-time driving and the condition of the vehicle 204. In certain embodiments, the telematics device 206 may contain or may be integral with one or more of the vehicle sensors 210. The telematics device 206 also may store the type of their respective vehicle 204, for example, the make, model, trim (or sub-model), year, and/or engine specifications, as well as other information such as vehicle owner or driver information, insurance information, and financing information for the vehicle 104.

In the example shown in FIG. 2, the telematics device 206 may receive vehicle telematics data from vehicle sensors 210, and may transmit the data to a safe driving evaluation system 202. However, in other examples, one or more of the vehicle sensors 210 may be configured to transmit data directly to a safe driving evaluation system 202 without using a telematics device 206. For instance, a telematics device 206 may be configured to receive and transmit data from certain vehicle sensors 210, while other sensors may be configured to directly transmit data to a safe driving evaluation system 202 without using the telematics device 206. Thus, telematics devices 206 may be optional in certain embodiments.

In certain embodiments, a mobile special-purpose computing device 212 within the vehicle 204 may be programmed with instructions to collect vehicle telematics data from telematics device 216 or from sensors 210, and then to transmit the vehicle telematics data to the safe driving evaluation system 202 and other external computing devices. The mobile special-purpose computing device 212 may include an accelerometer, a GPS unit, and a telecommunication unit. Software applications executing on the mobile special-purpose computing devices 212 may be configured to detect vehicle telematics data independently and/or may communicate with vehicle sensors 210 to receive additional vehicle telematics data. For example, the mobile special-purpose computing device 212 equipped with an accelerometer and/or a GPS unit may determine vehicle location, speed, direction and other basic vehicle telematics data without needing to communicate with the vehicle sensors 210, or any vehicle system. In other examples, software on the mobile special-purpose computing device 212 may be configured to receive some or all of the vehicle telematics data collected by vehicle sensors 210. In yet other examples, software on the mobile special-purpose computing device 212 may be configured to receive some or all of the vehicle telematics data from third-party telematics systems.

When the mobile special-purpose computing device 212 within the vehicle 204 is used to detect vehicle telematics data or to receive vehicle telematics data from the vehicle 204, the mobile special-purpose computing device 212 may store, analyze, or transmit the vehicle telematics data to one or more other devices. For example, the mobile special-purpose computing device 212 may transmit vehicle telematics data directly to a safe driving evaluation system 202, and thus may be used in conjunction with or instead of the telematics device 206. Moreover, the processing components of the mobile special-purpose computing device 212 may be used to collect and analyze vehicle telematics data for safe driving behaviors, provide a safe driving points to a driver for engaging in safe driving behaviors, issue rewards based on the safe driving points, allow the driver to redeem the rewards, and perform other related functions. Therefore, in certain embodiments, the mobile special-purpose computing device 212 may be used in conjunction with, or in place of, the safe driving evaluation unit 208.

The vehicle 204 may include a safe driving evaluation unit 208, which may be a separate computing device or may be integrated into one or more other components within the vehicle 204, such as the telematics device 206, the internal computing systems of the vehicle 204, or the mobile special-purpose computing device 212. As discussed above, the safe driving evaluation unit 208 also may be implemented by computing devices independent from the vehicle 204, such as one or more separate computer systems 240 (e.g., a user's home or office computer). In any of these examples, the safe driving evaluation unit 208 may contain some or all of the hardware/software components as the safe driving evaluation system 101 depicted in FIG. 1. Further, in certain implementations, the functionality of the safe driving evaluation unit 208, such as collecting and analyzing vehicle telematics data for safe driving behaviors, providing safe driving points to a driver for engaging in safe driving behaviors, issuing rewards based on the safe driving points, and allowing the driver to redeem the rewards, may be performed in a safe driving evaluation system 202 rather than by the individual vehicle 204. In such implementations, the vehicle 204 might only collect and transmit vehicle telematics data to a safe driving evaluation system 202, and thus the vehicle-based safe driving evaluation unit 208 may be optional.

The safe driving evaluation unit 208 may be implemented in hardware and/or software configured to receive vehicle telematics data from the vehicle sensors 210, the telematics device 206, and/or other vehicle telematics data sources. After receiving the vehicle telematics data, the safe driving evaluation unit 208 may perform functions to collect and analyze the vehicle telematics data for safe driving behaviors, provide safe driving points to a driver for engaging in safe driving behaviors, issue rewards based on the safe driving points, and allow the driver the redeem the rewards. For example, the safe driving evaluation unit 208 may analyze the vehicle telematics data analysis. The safe driving evaluation unit 208 may use the results of the vehicle telematics data analysis to determine whether the driver has engaged in any safe driving behaviors. Further descriptions and examples of the analyses that may be performed by the safe driving evaluation unit 208 are described below.

The safe driving evaluation system 202 may also acquire information about safe driving behaviors. Safe driving behaviors, as used in this description, refer to guidelines for safe driving. Safe driving behaviors may be maintained at the safe driving evaluation system 202 or at safe driving evaluation unit 208. Additionally or alternatively, the safe driving behaviors may be maintained at an insurance system 244. The safe driving evaluation system 202 may be in signal communication with the insurance system 244 via a network. The network may include one or more of a wired network (e.g., the Internet), a wireless network (e.g., a cellular network, Bluetooth, NFC), or a combination of wired or wireless networks. The safe driving evaluation system 202 may be in direct communication with a database within the insurance system 244, or may be in indirect communication with a database within the insurance system 244 via a remote service (e.g., a web service). In some examples, regardless of whether the safe driving behaviors are maintained at the safe driving evaluation system 202, safe driving evaluation unit 208, or insurance system 244, an insurance company may update the safe driving behaviors by adding new safe driving behaviors or modifying existing safe driving behaviors. Where the safe driving evaluation system 202 determines, based on the vehicle telematics data, that a driver has engaged in safe driving behaviors, the safe driving evaluation system 202 may provide safe driving points to the driver.

The safe driving evaluation system 202 may communicate the driver's safe driving status (e.g., number of safe driving points earned) to the insurance system 244. The safe driving evaluation system 202 may be in signal communication with the insurance system 244 via a network such as those described above. In some embodiments, an insurance company may use the safe driving data communicated to the insurance system 214 to create competition among drivers and issue additional rewards. For example, an insurance company may gamify the collection of safe driving points by providing a leaderboard that lists drivers' safe driving points.

In some examples, the safe driving evaluation system 202 may provide an interface for the driver to track driving performance, safe driving points earned, and the safe driving points leaderboard. As such, the interface may enable the driver to identify strengths and weaknesses, and to identify trends. Additionally, the interface may enable to driver view issued awards and to redeem the awards. The interface may be accessible via, for example, a web browser, desktop application, mobile application, or the like that resides at the safe driving evaluation system 101. In some examples, the interface may reside on the mobile special-purpose computing device 212. In other examples, the interface may be accessible through a separate computer 240.

Figure 3:
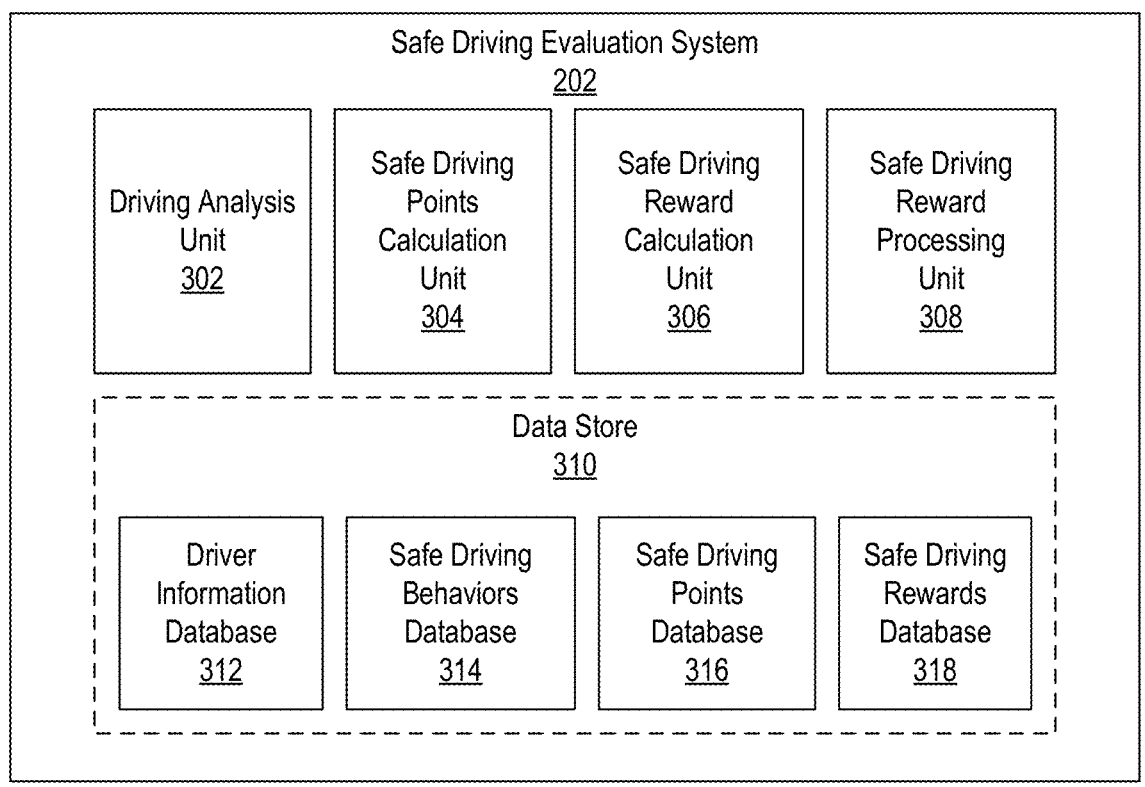
FIG. 3 is a block diagram of an example of an implementation of a safe driving evaluation system according to one or more aspects.

FIG. 3 shows an example implementation a safe driving evaluation system 202. In some example implementations, the safe driving evaluation system 202 is a special-purpose computing device programmed with instructions that, when executed, perform functions associated with using vehicle telematics data to reward drivers for engaging in safe driving behaviors. In these example implementations, the units 302-318 of the safe driving evaluation system 202 correspond to particular sets of instructions embodied as software programs residing at the safe driving evaluation system 202. In other example implementations, the safe driving evaluation system 202 is a collection of special-purpose computing devices that are interconnected and in signal communication with each other. In these examples, each unit 302-318 of the safe driving evaluation system 202 respectively corresponds to a special-purpose computing device programmed with a particular set of instructions, that, when executed, perform respective functions associated with using vehicle telematics data to reward drivers for engaging in safe driving behaviors. Such special-purpose computing devices may be, for example, application serves programmed to perform the particular set of functions.

The safe driving evaluation system 202, in this example, includes various units and databases that facilitate collecting and analyzing vehicle telematics data, providing safe driving points to a driver for engaging in safe driving behaviors, issuing rewards based on the safe driving points, and allowing a the driver to redeem the rewards. It will be appreciated that the safe driving evaluation system 202 illustrated in FIG. 3 is shown by way of example and that other implementations of the driving license evaluation system may include additional or alternative units and databases without departing from the scope of the claimed subject matter. In this example, the safe driving evaluation system 202 includes a driving analysis unit 302, a safe driving scoring unit 304, a safe driving reward calculation unit 306, a safe driving reward processing unit 308, and a safe driving customer database 310.

The data store 310 may store information related to safe driving behaviors, drivers, safe driving points, and rewards. For example, the data store may include a driver information database 312, a safe driving behaviors database 314, a safe driving points database 316, and a safe driving rewards database 318. The safe driving evaluation system 202 may utilize this information in determining safe driving behaviors, providing safe driving points, issuing rewards, and allowing redemption of rewards. It will be appreciated that in other examples the data store 310 may include additional and/or alternative databases. For example, it may be advantageous to group the information by an insurance company of an insurance policy held by a driver. Alternatively, information associated with non-insured drivers may be maintained separately from insured drivers.

The driver information database 312 may store information associated with drivers of vehicles (e.g., name of driver, contact information, vehicle identification, etc.). In some examples, the driver information database 312 may also store the driver's affiliation with one or more insurance companies.

The safe driving behaviors database 314 may store information associated with the safe driving behaviors required to earn safe driving points. As such, the safe driving behaviors database 314 may associate each safe driving behavior with a numerical value. The numerical value may reflect the safe driving behavior's importance in terms of driving safety. In some examples, the numerical value may be a number of safe driving points.

Safe driving behaviors may be defined as one or more driving events. A driving event may be based on the speed, acceleration, braking, turning, distance to other vehicles, seat belt usage, turn signal usage, and other vehicle telematics data collected from the vehicle 204. Thus, it will be appreciated that a variety of different safe driving behaviors may be defined based on a variety of different driving events. Further, a safe driving behavior may be defined in terms of distance travelled (e.g., one hundred miles) and/or time elapsed (e.g., one hour) during a trip (e.g., a period of time starting when the vehicle is turned on and ending when the vehicle is turned off). For example, a safe driving behavior based in part on speed may be a trip including 1 hour of highway driving within 5 mph of the prescribed speed limit. An example safe driving behavior based in part on braking or deceleration may be a trip including thirty minutes of city driving without occurrences of hard braking (e.g., deceleration of 7 mph/s or greater, etc.). An example safe driving behavior based in part on acceleration may be a trip including 30 minutes of highway driving without occurrences of fast acceleration (e.g., acceleration of 10 mph/s or greater, etc.). An example safe driving behavior based in part on turning may be a trip including fifty miles of driving with only soft turns (e.g., angle of turn greater than 90°, controlled turns, etc.). Another example safe driving behavior may be activating a turn signal at least hundred feet before initiating each turn of the trip. Safe driving conditions may also be based in part on particular driving conditions. For example, a safe driving behavior may be driving at least 10 mph below the speed limit during periods of the trip including inclement or severe weather (e.g., rain, snow, fog, etc.). It will be appreciated that additional or alternative safe driving behaviors may be selectively defined and implemented to encourage safe driving when operating a vehicle.

In some embodiments, a safe driving behavior category may be associated with a safe driving behavior in the safe driving behaviors database 314. For examples, safe driving behaviors based in part on speed may be associated with a safe speed driving behavior category. Similarly, safe driving behaviors based in part on braking may be associated with a safe braking driving behavior category. Other examples of safe driving behavior categories may include safe turning driving behavior, safe signaling driving behavior, safe distance driving behavior, and so forth.

In some examples, a safe driving behavior in the safe driving behaviors database 314 may be assigned a weight, where the weight may be used in calculating safe driving points. Additionally or alternatively, a safe driving behavior category may be assigned a weight, whereby one or more of the safe driving behaviors associated with the safe driving behavior category may be assigned a weight according to the weight assigned to the safe driving behavior category. For example, where a safe driving behavior category is assigned a particular weight, all safe driving behaviors associated with the safe driving behavior category are assigned the same weight. In another example, the weight assigned to a safe driving behavior category may be used as a default weight, which will be overridden by a weight assigned specifically to a safe driving behavior associated with the safe driving behavior category. The calculation of safe driving points will be described in further detail below.

In some embodiments, the safe driving behaviors database 314 may store safe driving behaviors as specified by different insurance companies. For example, the safe driving behaviors database 314 may maintain one set of safe driving behaviors for Insurance Company A, and another set of safe driving behaviors for Insurance Company B. In some examples, the sets of driving behaviors for Insurance Company A and Insurance Company B may overlap.

It will be appreciated that the safe driving behaviors database 314 may be optional in some example implementations of a safe driving evaluation system 202. For instance, where the safe driving evaluation system 202 may acquire the safe driving behaviors from an insurance company 244, the safe driving behaviors database 314 may be duplicative.

The safe driving points database 316 may store information associated with the safe driving points provided to a driver. The safe driving points database 316 may enable the safe driving evaluation system 202 to maintain the number of safe driving points earned by a driver. Thus, the safe driving points database 316 may maintain, e.g., through a database relationship, an association between a driver in the driver information database 312, and the number of safe driving points earned by a driver. As will be described in further detail below, the safe driving evaluation system 202 may provide a driver with safe driving points based at least on the information stored in the safe driving behaviors database 314 and the driver performance database 316.

The safe driving rewards database 318 may store information associated with rewards issued to a driver. The safe driving rewards database 318 may enable the safe driving evaluation system 202 to maintain rewards issued to the driver. In some examples, the safe driving rewards database 318 may store information regarding a status of each reward (e.g., Unused, Used, Expired, etc.), a mechanism for redemption (e.g., a coupon code, a QR code, etc.), and one or more vendors (e.g., one or more vehicle service systems 242) where the reward may be redeemed. As will be described in further detail below, the safe driving evaluation system 202 may provide a driver with rewards based on at least the information stored in the safe driving points database 318.

In an alternate embodiment, the safe driving points database 316 may store information associated the safe driving points for a particular vehicle. In this example, the safe driving points database 316 may enable the safe driving evaluation system 202 to maintain the number of safe driving points earned with respect to a particular vehicle based on the telematics data collected for that vehicle. Accordingly, the safe driving rewards database 318 may store information associated with rewards issued for a particular vehicle. As such, the safe driving evaluation system 202 may provide rewards to an individual associated with the vehicle based at least on the information stored in the driver information database 312. Where multiple individuals are associated with a vehicle (e.g., a shared vehicle), the safe driving evaluation system 202 may provide rewards to an individual designated as the primary driver of the vehicle, or distribute the rewards between each of the individuals (e.g., proportional to driving time, proportional to ownership interest, equally, and so forth). In some examples, the safe driving evaluation system 202 may provide vary the rewards based on the individual's association with an insurance company, such that an insurance customer may receive more or less of a reward than a non-insurance customer for the engaging in same or similar driving behaviors.

Figure 4:
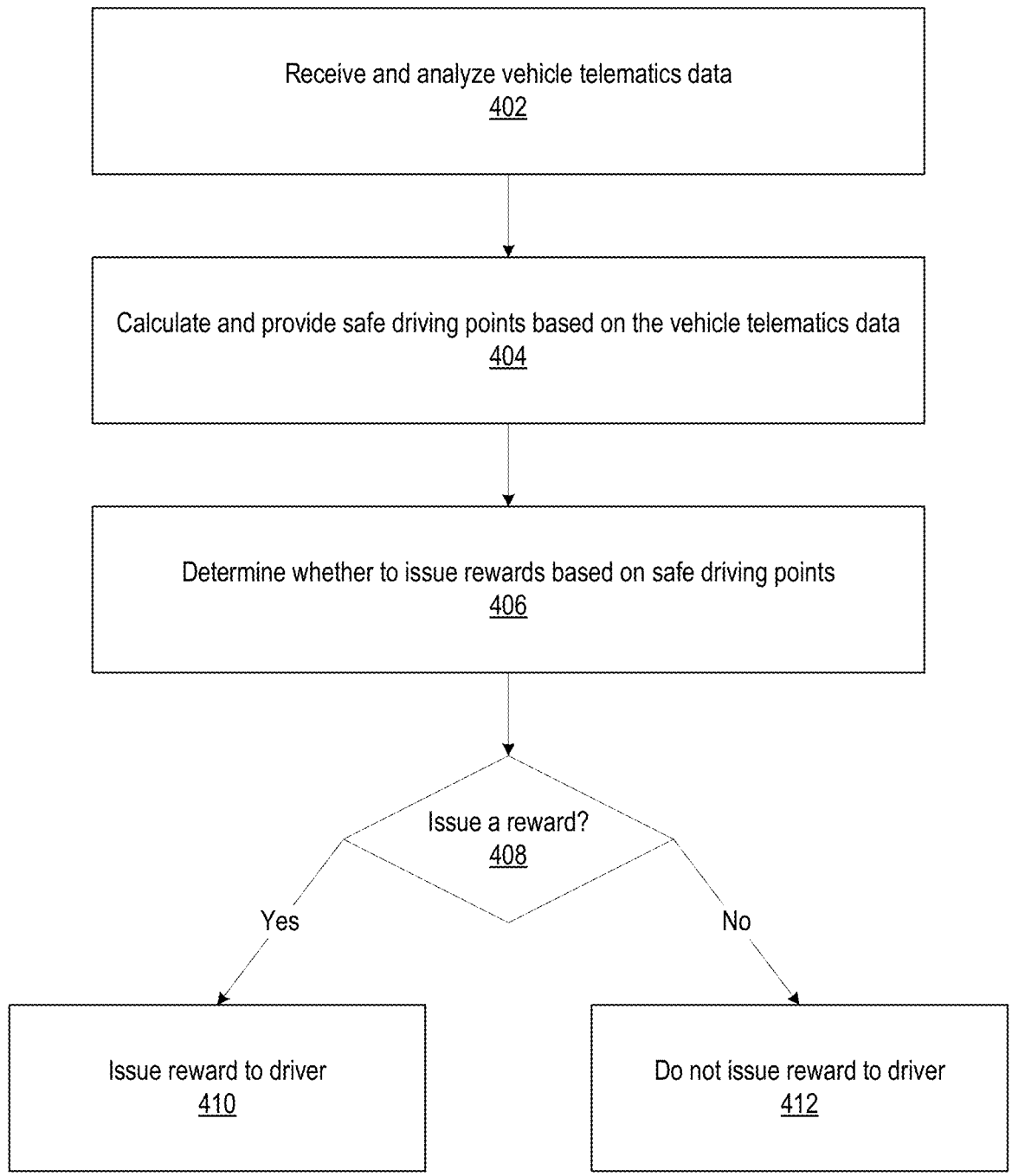
FIG. 4 is a flowchart of example method steps for analyzing vehicle telematics data, determining safe driving points, and providing rewards based on the vehicle telematics data.

Referring now to FIG. 4, a flowchart 400 of high-level example steps for analyzing vehicle telematics data, and providing safe driving points and/or rewards based on the vehicle telematics data is shown. The various components of the safe driving evaluation system 202 may be used to perform these method steps. The driving analysis unit 302 may receive and analyze vehicle telematics data (block 402) from the vehicle 204 (e.g., by a telematics device 206 installed at or attached to the vehicle, and/or by one or more sensors 210 installed at, attached to, and/or remotely located relative to the vehicle), from a mobile special-purpose computing device 212 (e.g., a mobile application installed on the mobile special-purpose computing device 212), or a combination thereof. The driving analysis unit 302 may analyze the vehicle telematics data to identify one or more driving events, one or more driving behaviors, and/or one or more driving conditions as described above. The driving analysis unit 302 may generate driving analysis results based on the driving events, behaviors, or conditions, and provide the driving analysis results to the safe driving points calculation unit 304.

In some examples, the vehicle telematics data from the various sources may first be collected at a central location (e.g., at the safe driving evaluation unit 208, at the mobile special-purpose computing device 212, etc.) and subsequently provided to the driving analysis unit 302. Thus, the driving analysis unit 302 may receive vehicle telematics data from the various sources in real-time, or may receive a compiled version of the vehicle telematics data from the central location. Where the driving analysis unit 302 receives vehicle telematics data in real-time, the driving analysis unit 302 may associate the vehicle telematics data received from the various sources with a single trip. In some examples, the various sources of the vehicle telematics data may assign a unique trip identifier to the vehicle telematics data, such that the driving analysis unit 302 associates all vehicle telematics data assigned to a particular unique trip identifier with a single trip. Additionally or alternatively, the driving analysis unit 302 may receive all vehicle telematics data associated with a trip from the central location. In some embodiments, the driving analysis unit 302 may send the vehicle telematics data to one or more insurance companies at an insurance system 244.

The safe driving points calculation unit 304 may calculate and provide safe driving points earned by a driver based on the vehicle telematics data received by the driving analysis unit 302 (block 404). The safe driving reward calculation unit 306 may determine whether to issue rewards based on the safe driving points earned by the driver (block 406). If the safe driving reward calculation unit 306 determines to issue a reward (block 408), the safe driving reward calculation unit 306 may issue a reward to the driver (block 410). The reward may be a discount towards a vehicular service (e.g., gas, towing, maintenance, etc.). The reward may be redeemable at a vehicle service system 242 via a mechanism for redemption (e.g., a coupon code, a QR code, barcode, etc.). Conversely, if the safe driving reward calculation unit 306 determines not to issue a reward (block 408), then the safe driving reward calculation unit 306 may not issue a reward to the driver (block 412).

Figure 5:
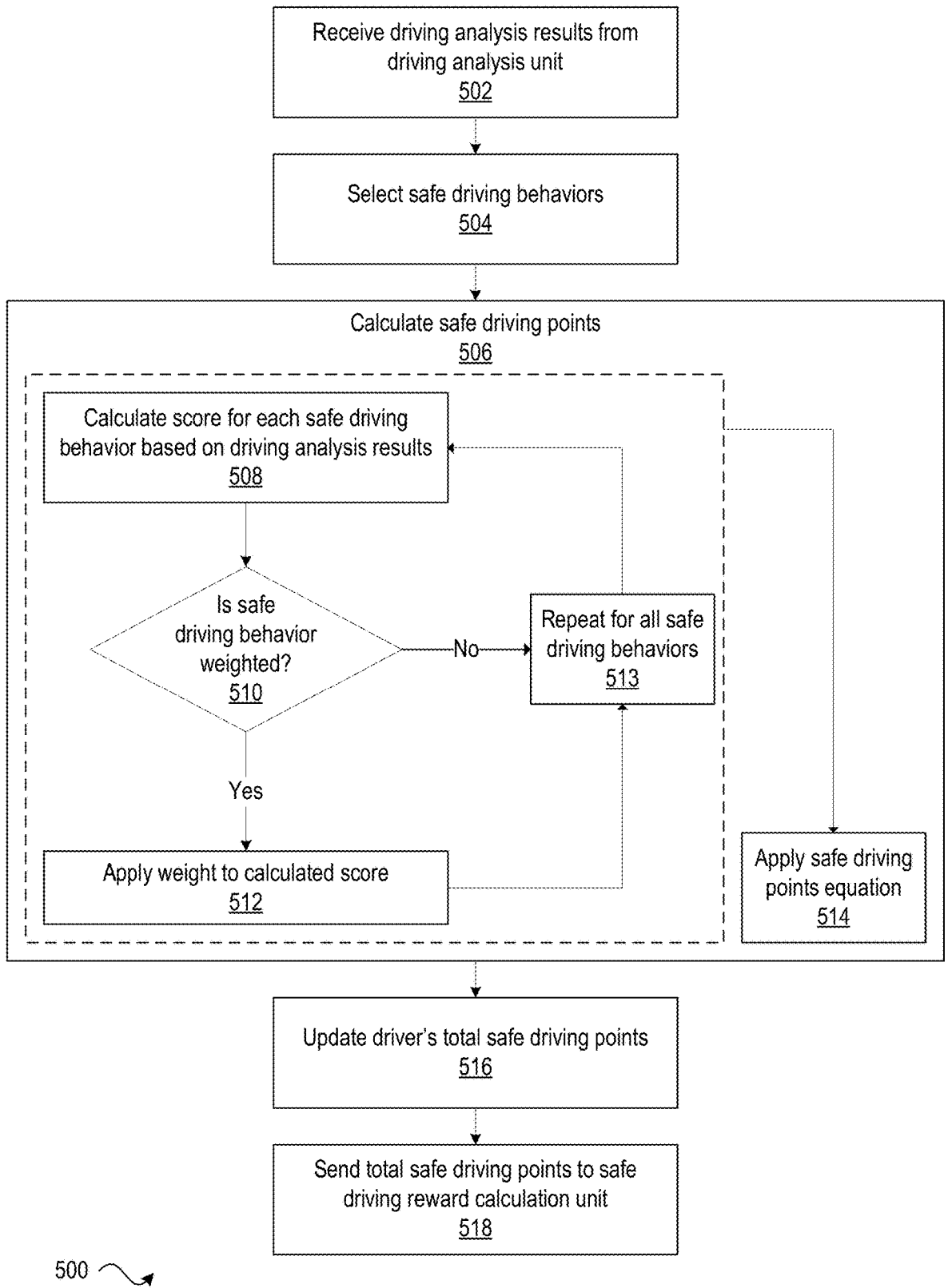
FIG. 5 is a flowchart of example method steps for determining safe driving points.

Referring to FIG. 5, a flowchart 500 of example method steps for calculating and providing safe driving points is shown. The safe driving calculation unit 304 may be configured to calculate and provide safe driving points on-demand as vehicle telematics data is received and processed by the driving analysis unit 302 (e.g., in real-time, at the end of each trip, etc.), or at regular intervals (e.g., daily, monthly, quarterly, annually, etc.). The safe driving points calculation unit 304 may receive the driving analysis results from the driving analysis unit (block 502). The safe driving points calculation unit 304 may select a set of safe driving behaviors upon which to base the total safe driving points provided to the driver (block 504). The set of safe driving behaviors comprise one or more safe driving behaviors defined in the safe driving behaviors database 314. In some embodiments, the set of safe driving behaviors may include all of the safe driving behaviors defined in the safe driving behaviors database 314. In other embodiments, the set of safe driving behaviors may be a subset of the safe driving behaviors defined in the safe driving behaviors database 314. For example, the set of safe driving behaviors may be limited to safe driving behaviors associated with one or more safe driving behavior categories. In another example, the set of safe driving behaviors may be limited to safe driving behaviors associated with a particular insurance company. In yet another example, the set of safe driving behaviors may be based on the driving analysis results received. Thus, the set of safe driving behaviors used to calculate and provide safe driving points may vary for drivers using the safe driving points acquisition system 200. Alternatively, a uniform set of safe driving behaviors may be employed to calculate and provide safe driving points.

Based on the selected set of safe driving behaviors, the safe driving points calculation unit 304 may calculate a number of safe driving points to provide the driver (block 506). For each safe driving behavior in the selected set of safe driving behaviors, the safe driving points calculation unit 304 may calculate a score based on the driving analysis results (block 508). Specifically, the safe driving points calculation unit 304 may first determine whether the safe driving behavior was exhibited in the driving analysis results. For example, where the safe driving behavior is based on maintaining an average speed below 50 mph during a trip, the safe driving points calculation unit 304 may determine whether the driving analysis results for a particular trip reflected an average speed below 50 mph by comparing the average speed of the trip with the 50 mph limit. In some examples, the driving analysis results may include overall trip metrics (e.g., minimum/maximum/average speed, number of hard brakes, total miles traveled, etc.), such that the safe driving points calculation unit 304 may compare the metrics to the requirements of a safe driving behavior. However, in other examples, the safe driving points calculation unit 304 may need to derive one or more trip metrics in order to make a determination as to whether a driver engaged in a safe driving behavior. For example, where a safe driving behavior involves two or more conditions (e.g., maintaining an average speed at least 10 mph below the speed limit while driving in rain), the safe driving points calculation unit 304 may create a subset of driving analysis results corresponding to periods of rain, and compute an average speed for the subset of driving analysis results.

Where the safe driving points calculation unit 304 determines that the driver engaged in a safe driving behavior based on the driving analysis results, the safe driving points calculation unit 304 may use the numerical value associated with the safe driving behavior in the safe driving behaviors database 314 as the score of the safe driving behavior. The safe driving points calculation unit 304 may adjust the score of the safe driving behavior based on a weight assigned to the safe driving behavior in the safe driving behaviors database 314 (block 510). Where the safe driving behavior is assigned a weight, the safe driving points calculation unit 304 may combine the score of the safe driving behavior with the weight of the safe driving behavior (e.g., by multiplying the weight and the numerical value) (block 512). Additionally or alternatively, the safe driving points calculation unit 304 may use the weight assigned to the safe driving behavior category associated with the safe driving behavior in the safe driving behaviors database 314 to adjust the score of the safe driving behavior.

The safe driving points calculation unit 304 may repeat these method steps (blocks 508, 510, and 512) for all safe driving behaviors in the selected set of safe driving behaviors. As such, the safe driving points calculation unit 304 may calculate a score (weighted or non-weighted) for each safe driving behavior in the selected set of safe driving behaviors.

The safe driving points calculation unit 304 may apply a safe driving points equation to the number of safe driving points to provide to the driver (block 514). In some examples, the safe driving points equation may aggregate the scores for each safe driving behavior in the selected set of safe driving behaviors. An example of a safe driving points equation may be:

$$\text{safe driving points} = \text{safe\_driving\_behavior}[1].\text{score} + \text{safe\_driving\_behavior}[2].\text{score} + \ldots + \text{safe\_driving\_behavior}[n].\text{score}$$

where safe_driving_behavior[1].score . . . safe_driving_behavior[n].score are the respective scores for each safe driving behavior in the selected set of safe driving behaviors. In some examples, the scores for each safe driving behavior may be weighted, as described above. Additionally or alternatively, the scores for each safe driving behavior may be weighted by the safe driving points equation.

An example of a safe driving points equation with weights may be:

$$\text{safe driving points} = (\text{safe\_driving\_behavior}[1].\text{score} \times \text{weight}[1]) + (\text{safe\_driving\_behavior}[2].\text{score} \times \text{weight}[2]) + \ldots + (\text{safe\_driving\_behavior}[n].\text{score} \times \text{weight}[n])$$

where weight[1] . . . weight[n] are the weights respectively associated with safe_driving_behavior[1] . . . safe_driving_behavior[n].

It will be appreciated that additional or alternative mathematical operations may be selectively employed to aggregate the scores for each safe driving behavior in the selected set of safe driving behaviors. It will also be appreciated that the safe driving points calculation unit 304 may be configured to employ one or more safe driving points equations that respectively aggregate different safe driving behaviors. For example, where an insurance company (e.g., Insurance Company A) maintains a set of safe driving behaviors (e.g., Safe Driving Behaviors A), the insurance company may also maintain a corresponding safe driving points equation (e.g., Safe Driving Points Equation A) to aggregate the scores associated with each safe driving behavior in Safe Driving Behaviors A.

In some embodiments, the safe driving points equation may include a penalty for unsafe driving behaviors. Thus, where the driving analysis results indicates that the driver engages in unsafe driving behaviors, the safe driving points calculation unit 304 may deduct points accordingly. One more sets of unsafe driving behaviors may be stored in the safe driving behaviors database 314, or in a different database (e.g., an unsafe driving behaviors database). The safe driving points calculation unit 304 may thus repeat steps 508-512 for the unsafe driving behaviors, such that the safe driving points calculation unit 304 calculates a score (weighted or non-weighted) for each unsafe driving behavior, and aggregates these scores to calculate a unsafe driving score penalty. The unsafe driving score penalty is subtracted from the aggregated safe driving behaviors scores in the safe driving points equation. As described in reference to safe driving behaviors, the unsafe driving behaviors may be stored as specified by different insurance companies. For example, one set of unsafe driving behaviors may be maintained for Insurance Company A, and another set of unsafe driving behaviors may be maintained for Insurance Company B. The various sets of unsafe driving behaviors may overlap.

The safe driving points calculation unit 304 may update the total number of safe driving points earned by the driver based on the output of the safe driving points equation (block 516). The safe driving points calculation unit 304 may update the safe driving points database 316 to reflect an increased number of safe driving points for a particular driver. In some examples, where the safe driving points database 316 contains a non-zero value amount of total safe driving points for a particular driver, the safe driving points calculation unit 304 may increment this value by the output of the safe driving points equation, as calculated in block 506. The safe driving points calculation unit 304 may send the updated total number of safe driving points to the safe driving reward calculation unit 306 (block 518). In some embodiments, the safe driving points calculation unit 304 may also send the updated total number of safe driving points to one or more insurance companies at an insurance system 244. In some embodiments, the safe driving points calculation unit 304 may be configured to limit the total number of safe driving points earned by the driver over a period of time. For example, the safe driving points calculation unit 304 may be configured to allow no more than 1000 safe driving points per calendar year per driver. In another example, the safe driving points calculation unit 304 may be configured to allow no more than 100,000 safe driving points per calendar year for all drivers. As such, in some examples, the safe driving points calculation unit 304 may increment the total number of safe driving points earned by the driver by an amount less than the output of the safe driving points equation (block 516).

In an alternate embodiment, the safe driving points calculation unit 304 may calculate safe driving points for each set of driving behaviors in the safe driving behaviors database 314. For example, the safe driving points calculation unit 304 may calculate and maintain safe driving points for each insurance company. For example, after one trip, a driver may earn 450 safe driving points based on safe driving behaviors for Insurance Company A, but the same driver may earn 500 safe driving points based on safe driving behaviors for Insurance Company B. As such, the safe driving evaluation system 202 may maintain the total safe driving points earned by a driver from the perspective of each insurance company.

In some embodiments, the safe driving points calculation unit 304 may also calculate a number of safe driving points to provide to the driver based on a driver's interaction with the safe driving evaluation system 202. For example, the safe driving points calculation unit 304 may provide safe driving points to a driver for enrolling in the safe driving points program (e.g., creating a driver account associated with the safe driving evaluation system 202). In other examples, the safe driving points calculation unit 304 may provide safe driving points to a driver for further engaging with the safe driving evaluation system 202, such as, taking a survey, emailing a promotion code, or learning about safe driving (e.g., participating in a safe driving tutorial, watching a safe driving video, etc.).

Figure 6:
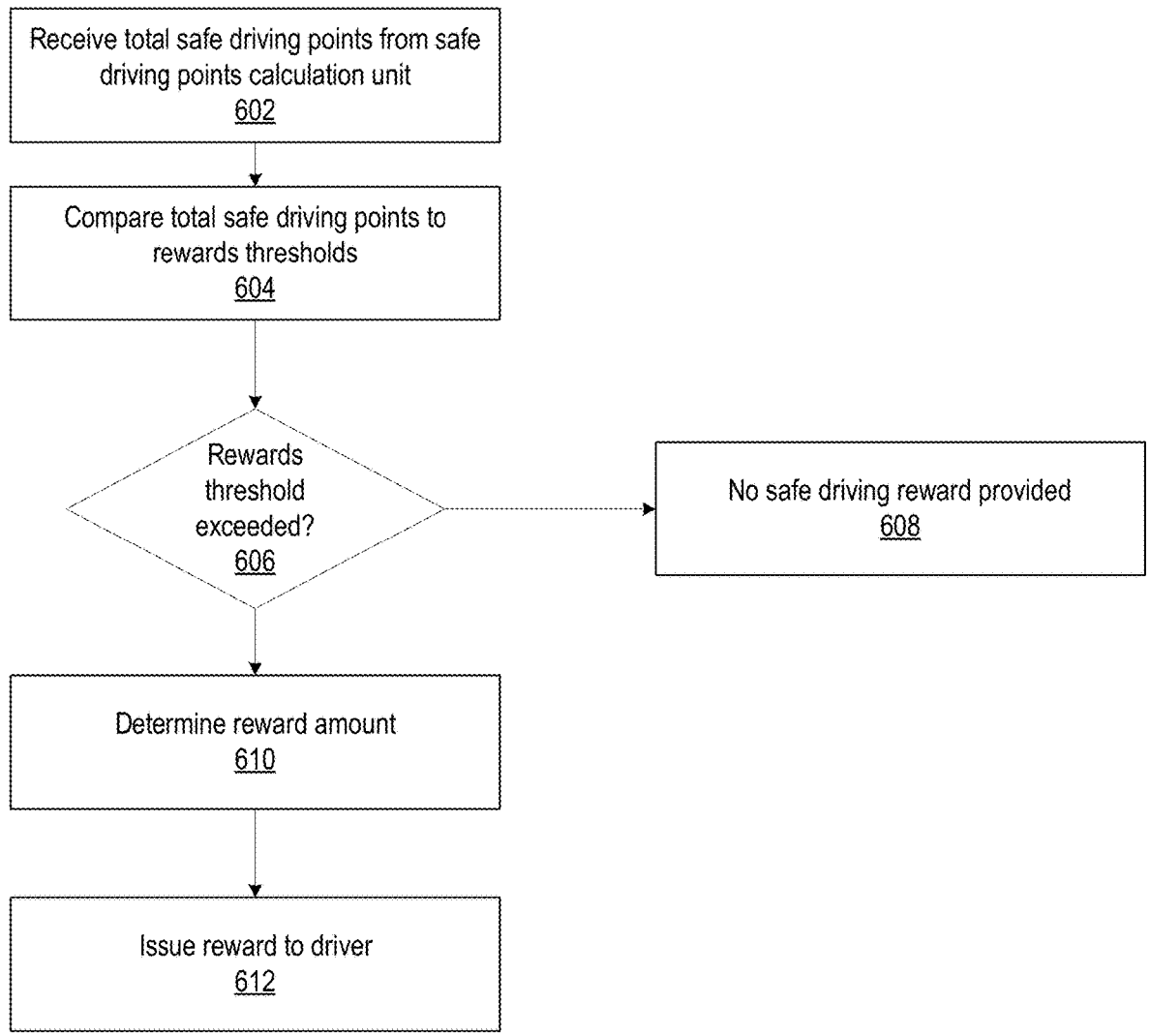
FIG. 6 is a flowchart of example method steps for determining a safe driving reward based on safe driving points.

Referring now to FIG. 6, a flowchart 600 of example method steps for determining a safe driving reward based on safe driving points is shown. The safe driving reward calculation unit 306 may receive a number of safe driving points earned by a driver to determine whether or not to issue a safe driving reward, and if so, to determine the amount of the safe driving reward. For example, the safe driving reward calculation unit 306 may receive a total safe driving points earned by a driver from the safe driving points calculation unit 304 (block 602).

The safe driving reward calculation unit 306 may compare the total safe driving points to one or more reward thresholds (block 604). Where the driver does not meet or exceed at least one rewards threshold, the safe driving reward calculation unit 306 may determine not to issue a safe driving reward (block 608). If the total safe driving points exceeds at least one rewards threshold, the safe driving reward calculation unit 306 may determine to provide a safe driving reward. In some embodiments, the safe driving reward calculation unit 306 may define one reward threshold (e.g., 500 safe driving points), whereby drivers with total safe driving points at or above the reward threshold receive rewards. In other embodiments, the safe driving reward calculation unit 306 may define more than one reward threshold (e.g., 500 safe driving points, 1000 safe driving points, 2000 safe driving points, etc.), so as to create a tiered system of rewards. In such examples, the safe driving reward calculation unit 306 may reward a driver having between 500 and 999 total safe driving points differently from a driver having 1000 safe driving points or more. For example, the safe driving reward calculation unit 306 may issue a fewer number of rewards to a driver having between 500 and 999 total safe driving points as compared to a driver having 1000 safe driving points or more. Additionally or alternatively, the safe driving reward calculation unit 306 may issue rewards of a higher amount for a driver having 1000 safe driving points or more as compared to a driver having between 500 and 1000 safe driving points. In some examples, the safe driving reward calculation unit 306 may use a uniform set of reward thresholds for all drivers. In other examples, the safe driving reward calculation unit 306 may use reward thresholds as specified by different insurance companies. For example, the safe driving reward calculation unit 306 may use one set of reward thresholds for Insurance Company A (e.g., 100 safe driving points, 200 safe driving points, 300 safe driving points, etc.), and another set of reward thresholds for Insurance Company B (e.g., 500 safe driving points, 1000 safe driving points, 2000 safe driving points, etc.). In some examples, the sets of reward thresholds defined for the various insurance companies may overlap.

The safe driving reward may be a discount on goods and/or services available at a physical or online store. In other examples, the safe driving reward may be a discount on vehicular services, such as gas, towing services, vehicle maintenance, vehicle repair shops, roadside assistance, and so forth. Types of discounts may include, but are not limited to, a deduction of a dollar amount from a price of a product/service, a deduction of a dollar amount from an entire order, a deduction of a percentage from a price of a product/service, a deduction of a percentage from an entire order, etc.). In some examples, a safe driving reward may include a free ancillary product/service (e.g., free item from convenience store, free oil change, etc.). In yet other examples, the safe driving reward may be used to obtain fixed/guaranteed prices for gas, regardless of the current gas price. In such examples, the driver may redeem gas at fixed/guaranteed prices for a predetermined period of time or indefinitely. As such, the safe driving reward may represent a cap on fuel prices for a predetermined period of time or indefinitely.

Where safe driving reward calculation unit 306 determines to provide a safe driving reward, the safe driving reward calculation unit 306 may determine a reward amount (block 610). In some examples, the amount of the safe driver reward may be uniform regardless of the total safe driving points (i.e., the exceeded rewards threshold). For instance, a driver having total safe driving points greater than a first rewards threshold may receive the same safe driving reward as a driver having total safe driving points greater than a second rewards threshold, where the first rewards threshold is lower than the second rewards threshold. Thus, a driver having total safe driving points greater than a second rewards threshold may have previously received the same safe driving award for exceeding the first rewards threshold. In other examples, the amount of the safe driver reward may be based on the total safe driving points (i.e., the exceeded rewards threshold). For instance, a driver having a total safe driving points greater than a first rewards threshold may receive a safe driving reward of a lower amount than a driver having total safe driving points greater than a second rewards threshold. For embodiments where the safe driving reward is a fixed price on gas, the fixed price may, in some examples, be the same for all rewards thresholds, and in other examples, may vary for each rewards thresholds.

The safe driving reward calculation unit 306 may issue a safe driving reward to a driver (block 612). The amount of the safe driving reward may correspond to the reward amount determined in block 610. The issued safe driving award may be stored in the safe driving rewards database 318. As described earlier, the safe driving reward may be represented in various formats, such as a coupon code, a QR code, a barcode, and so forth. The safe driving award may be marked as Unused, until it is redeemed by the driver. The safe driving reward calculation unit 306 may also specify terms and conditions of use/redemption of a safe driving reward. For example, the safe driving reward calculation unit 306 may restrict the usage of the safe driving reward by limiting the number of times it may be redeemed (e.g., safe driving reward may be redeemed an unlimited number of times, safe driving reward may only be redeemed once per driver, safe driving reward may be redeemed only one by any driver, safe driving reward may not be redeemed along with other rewards/coupons, etc.). The safe driving reward calculation unit 306 may also restrict the safe driving reward such that it is only redeemable for certain products and/or services, or at certain vehicle service centers. The safe driving reward calculation unit 306 may also restrict the duration that the safe driving reward is valid by, for example, setting a begin date (drivers will not be able to redeem the safe driving reward prior to this date) and/or by setting an end date (drivers will not be able to redeem the safe driving reward after this date). It will be appreciated that the safe driving reward calculation unit 306 may be configured to other aspects of redeeming a safe driving reward. A driver may view and redeem safe driving rewards through the mobile special-purpose computing device 212 (e.g., via a mobile application installed on the mobile special-purpose computing device 212).

Figure 7:
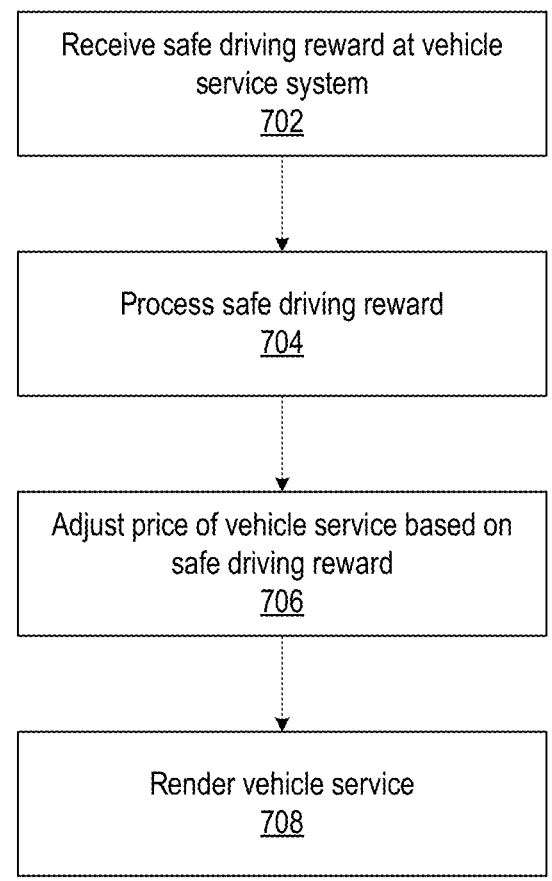
FIG. 7 is a flowchart of example method steps for redeeming and processing a safe driving reward.

Referring now to FIG. 7, a flowchart 700 of example method steps for redeeming and processing a safe driving reward is shown. The vehicle service system 242 may receive a safe driving reward as an input (block 702). In some examples, the driver may present the safe driving reward to the vehicle service system 242 through a wireless network. In other examples, the driver may present the safe driving reward to the vehicle service system 242 by interacting with an input device configured to operate in conjunction with the vehicle service system 242. For example, the driver may present the present the safe driving reward to the vehicle service system 242 via a mobile special-purpose computing device 212. Additionally or alternatively, the driver may present a printed version of the safe driving reward to the vehicle service system 242. The vehicle service system 242 may be equipped with one or more input devices to receive the safe driving reward from a driver. For example, where the safe driving reward is represented as a QR code, the vehicle service system 242 may be equipped with a QR code scanner. Where the safe driving reward is represented as a barcode, the vehicle service system 242 may be equipped with a barcode scanner. Where the safe driving reward is represented as an alphanumeric coupon code, the vehicle service system 242 may be equipped with a keyboard, or similar device. Additionally or alternatively, the vehicle service system 242 may be equipped with an optical character recognition (OCR) device. It will be appreciated that the vehicle service system 242 may be equipped with additional or alternative input devices capable of receiving a safe driving reward from the driver.

Upon receiving the safe driving reward, the vehicle service system 242 may process the safe driving reward (block 704). For example, the vehicle service system 242 may validate the safe driving reward based on its term and conditions, and/or other restrictions. For example, the vehicle service system 242 may validate whether the begin date of the safe driving reward is before the current date and/or the end date of the safe driving reward is after the current date. In another example, the vehicle service system 242 may verify that service to which the vehicle service system 242 is associated (e.g., gas station, vehicle maintenance, vehicle repair, roadside assistance, etc.) is not restricted by the safe driving reward. Further, the vehicle service system 242 may determine whether the safe driving reward has not reached its limit on the number of times it may be redeemed. As such, the vehicle service system 242 may be in communication with the safe driving evaluation system 202 to determine a current status (e.g., Unused, Used, Expired), or a limit on the number of times the safe driving reward has been redeemed by a particular driver.

Where the vehicle service system 242 determines that the redemption of a safe driving reward meets the specified terms and conditions or restrictions, the vehicle service system 242 may adjust the price of the product/service based on the discount specified by the safe driving reward (block 706). For example, where the safe driving reward specifies deducting a dollar amount or percentage from the product, service, or order, the vehicle service system 242 may adjust the price of the product/service order to reflect the deduction. In another example, where the safe driving reward specifies a fixed price of gas at a gas station, the vehicle service system may calculate the price of the product/service based on the specified fixed price, rather than the current market price. As such, a driver may be able to secure fixed (i.e. lower) gas prices by engaging in safe driving behaviors. Further, where the safe driving reward may be used more than once by a driver, a driver may be able to obtain gas at a fixed price for an extended period of time.

The vehicle service system 242 may render the product/service, or instruct the service-providing machine (e.g., gas pump, vehicle repair facility, vehicle maintenance facility, roadside assistance system, towing service system, physical or online store, etc.) to render the product/service (block 708). For example, where the service providing machine is a gas pump, the vehicle service system 242 may instruct the gas pump to dispense a gas. In another example, where the service providing machine is a vehicle repair facility, the vehicle service system 242 may instruct the vehicle repair facility to perform a repair. In yet another example, where the service providing machine is a physical or online store, the vehicle service system 242 may instruct the special-purpose computing device associated with the store to dispense a product. In an alternate embodiment, the vehicle service system 242 may render the product/service prior to, contemporaneously with, or after adjusting the price of the product/service.

As described in this disclosure, the safe driving evaluation system 202 encourages safe driving by providing rewards for driving engaging in safe driving behaviors. In an effort to publicly recognize safe driving, the rewards may be provided to both insurance customers and non-insurance customers. In an example embodiment, a driver's driving performance, number of safe driving points, and rewards earned may be communicated to one or more insurance companies. The insurance companies may subsequently use this information to provide additional rewards and benefits to insurance customers and/or non-insurance customers. It will be appreciated that the rewards and benefits offered by the safe driving evaluation system 202 may be subject to any applicable regulations (e.g. insurance regulations). In some examples, the additional rewards and benefits may be associated with new or existing insurance policies. For example, the insurance companies may offer reduced premiums or deductibles on existing insurance policies (e.g., for family or friends of the driver), where such reductions may escalate as the driver earns more safe driving points or rewards. In another example, the insurance companies may guarantee insurance or terms (e.g., premiums or deductibles) of an insurance policy for non-insurance customers enrolled participating in the safe driving points acquisition system 200. It will be appreciated that the collection of driving data for insurance and non-insurance customers may advantageously allow insurance companies to offer more accurate rates for new and existing customers.

While the disclosure has been described with respect to specific examples including presently illustrative modes of carrying out the disclosure, a person having ordinary skill in the art, after review of the entirety disclosed herein, will appreciate that there are numerous variations and permutations of the above-described systems and techniques that fall within the spirit and scope of the disclosure.

What is claimed is:

1. A safe driving evaluation system comprising:
   at least one processor;
   a data store storing a plurality of safe driving behaviors and a plurality of unsafe driving behaviors; and
   memory storing computer-readable instructions that, when executed by the at least one processor, cause the system to:
   receive, from a mobile telematics device comprising an accelerometer, vehicle telematics data associated with a vehicle, wherein:
      the mobile telematics device travels within the vehicle during operation of the vehicle and generates at least a portion of the vehicle telematics data using the accelerometer, and
      the vehicle telematics data characterizes a speed of the vehicle, an acceleration of the vehicle, a braking of the vehicle, and a cornering of the vehicle;
   receive traffic data associated with a location of the vehicle, wherein the traffic data comprises an indication of one or more accidents associated with the location of the vehicle;
   identify, by analyzing the vehicle telematics data and the traffic data, one or more driving events that occurred during operation of the vehicle;
   select, based on the one or more driving events identified, one or more safe driving behaviors from the plurality of safe driving behaviors;
   select, based on the one or more driving events identified, one or more unsafe driving behaviors from the plurality of unsafe driving behaviors;
   determine, based at least on a comparison of the vehicle telematics data and the one or more safe driving behaviors selected, a number of safe driving points to award to an individual associated with the vehicle;
   determine, based at least on a second comparison of the vehicle telematics data and the one or more unsafe driving behaviors selected, a penalty;
   reduce, based at least on the penalty, the number of safe driving points;
   determine, based at least on the number of safe driving points, a safe driving reward;
   determine a plurality of individuals associated with the vehicle;
   provide, to each individual of the plurality of individuals associated with the vehicle and in a proportion based on a driving time of each individual of the plurality of individuals, the safe driving reward;
   determine one of the plurality of individuals corresponding to the telematics data; and
   display, in an interface and based on the one or more safe driving behaviors selected and the one or more unsafe driving behaviors selected;
      an indication of a portion of the safe driving reward provided to the one of the plurality of individuals; and
      a driving performance trend of the one of the plurality of individuals during operation of the vehicle, wherein the indication of the driving performance trend identifies strengths and weaknesses of the one of the plurality of individuals.

2. The system of claim 1 wherein the instructions, when executed by the at least one processor, further cause the system to:
   determine, for each of the one or more safe driving behaviors selected, a safe driving score based, at least in part, on a third comparison of the vehicle telematics data and a respective safe driving behavior, wherein determining the number of safe driving points comprises aggregating each safe driving score to obtain the number of safe driving points.

3. The system of claim 2, wherein the instructions, when executed by the at least one processor, further cause the system to:

determine, for each of the one or more unsafe driving behaviors, an unsafe driving score based, at least in part, on a fourth comparison of the vehicle telematics data to a respective unsafe driving behavior, wherein determining the penalty comprises aggregating each unsafe driving score.

4. The system of claim 3, wherein the instructions, when executed by the at least one processor, further cause the system to:
increment a total number of safe driving points associated with the individual by the number of safe driving points.

5. The system of claim 4, wherein the instructions, when executed by the at least one processor, further cause the system to:
determine a safe driving reward amount based, at least in part, on a fifth comparison of the total number of safe driving points associated with the individual to one or more rewards thresholds.

6. The system of claim 1, wherein the safe driving reward is redeemable at a vehicle service system associated with a gas pump.

7. The system of claim 1, wherein the safe driving reward is represented as a QR code.

8. The system of claim 3, wherein:
the plurality of safe driving behaviors comprises at least one of:
(i) a safe driving behavior based, at least in part, on a total number of instances of speed of the vehicle below a first predetermined speed threshold,
(ii) a safe driving behavior based, at least in part, on a total number of instances of acceleration of the vehicle below a first predetermined acceleration threshold, or
(iii) a safe driving behavior based, at least in part, on a total number of instances of deceleration of the vehicle below a first predetermined deceleration threshold; and
the plurality of unsafe driving behaviors comprises at least one of:
(i) an unsafe driving behavior based, at least in part, on a total number of instances of speed of the vehicle above a second predetermined speed threshold greater than or equal to the first predetermined speed threshold,
(ii) an unsafe driving behavior based, at least in part, on a total number of instances of acceleration of the vehicle above a second predetermined acceleration threshold greater than or equal to the first predetermined acceleration threshold, or
(iii) an unsafe driving behavior based, at least in part, on a total number of instances of deceleration of the vehicle above a second predetermined deceleration threshold greater than or equal to the first predetermined deceleration threshold.

9. The system of claim 5, wherein the safe driving reward amount is a guaranteed gas price.

10. A computer-assisted method of rewarding safe driving behaviors comprising:
at a safe driving evaluation system comprising one or more processors, a data store, and a network interface:
storing, at the data store, a plurality of safe driving behaviors and a plurality of unsafe driving behaviors;
receiving, via the network interface from a mobile telematics device comprising an accelerometer, vehicle telematics data associated with a vehicle, wherein:
the mobile telematics device travels within the vehicle during operation of the vehicle and generates at least a portion of the vehicle telematics data using the accelerometer, and
the vehicle telematics data characterizes a speed of the vehicle, an acceleration of the vehicle, a braking of the vehicle, and a cornering of the vehicle;
receive traffic data associated with a location of the vehicle, wherein the traffic data comprises an indication of one or more accidents associated with the location of the vehicle;
identifying, based on an analysis of the vehicle telematics data and the traffic data, one or more driving events that occurred during operation of the vehicle;
selecting, based on the one or more driving events identified, one or more safe driving behaviors from the plurality of safe driving behaviors;
selecting, based on the one or more driving events identified, one or more unsafe driving behaviors from the plurality of unsafe driving behaviors, wherein the one or more safe driving behaviors are weighted based on the insurance policy associated with the vehicle;
determining, based on a comparison of the vehicle telematics data to the one or more safe driving behaviors, a number of safe driving points to award to an individual associated with the vehicle;
determining, based on a second comparison of the vehicle telematics data to the one or more unsafe driving behaviors, a penalty;
reducing, based on the penalty, the number of safe driving points awarded;
determining, based on the number of safe driving points awarded, a safe driving reward;
determining a plurality of individuals associated with the vehicle;
providing, to each individual of the plurality of individuals associated with the vehicle and in a proportion based on a driving time of each individual of the plurality of individuals, the safe driving reward;
determining one of the plurality of individuals corresponding to the telematics data; and
displaying, in an interface and based on the one or more safe driving behaviors selected and the one or more unsafe driving behaviors selected;
an indication of a portion of the safe driving reward provided to the one of the plurality of individuals; and
a driving performance trend of the one of the plurality of individuals during operation of the vehicle, wherein the indication of the driving performance trend identifies strengths and weaknesses of the one of the plurality of individuals.

11. The computer-assisted method of claim 10, further comprising:
determining, for each of the one or more safe driving behaviors selected, a safe driving score based at least in part, on a third comparison of the vehicle telematics data to a respective safe driving behavior, wherein determining the number of safe driving points comprises aggregating each safe driving score.

12. The computer-assisted method of claim 11, further comprising:

determining, for each of the one or more unsafe driving behaviors selected, an unsafe driving score based, at least in part, on a fourth comparison of the vehicle telematics a the respective unsafe driving behavior, wherein determining the penalty comprises aggregating each unsafe driving score.

13. The computer-assisted method of claim 12, further comprising:
incrementing a total number of safe driving points associated with the individual by the number of safe driving points.

14. The computer-assisted method of claim 13, further comprising:
determining a safe driving reward amount based, at least in part, on a fifth comparison of the total number of safe driving points associated with the individual to one or more rewards thresholds.

15. The computer-assisted method of claim 10, wherein the safe driving reward amount is a guaranteed gas price.

16. A system comprising:
a mobile telematics device in a vehicle comprising:
one or more processors; and
memory storing instructions that, when executed by the one or more processors, cause the mobile telematics device to:
determine vehicle telematics data of the vehicle using at least an accelerometer, wherein the vehicle telematics data characterizes a speed of the vehicle, an acceleration of the vehicle, a braking of the vehicle, and a cornering of the vehicle; and
transmit the vehicle telematics data to a safe driving evaluation device; and
the safe driving evaluation device, comprising:
one or more second processors; and
second memory storing second instructions that, when executed by the one or more second processors; cause the safe driving evaluation device to:
receive, from the mobile telematics device, the vehicle telematics data;
receive traffic data associated with a location of the vehicle, wherein the traffic data comprises an indication of one or more accidents associated with the location of the vehicle;
identify, based on the vehicle telematics data and the traffic data, one or more driving events that occurred during operation of the vehicle;
select, based on the one or more driving events identified, one or more safe driving behaviors and one or more unsafe driving behaviors;
determine, based at least on a comparison of the vehicle telematics data and the one or more safe driving behaviors, a number of safe driving points to award to an individual associated with the vehicle;
reduce, based at least on a second comparison of the vehicle telematics data and the one or more unsafe driving behaviors, the number of safe driving points;
determine, based at least on the reduced number of safe driving points, a safe driving reward;
determine a plurality of individuals associated with the vehicle;
provide, to each individual of the plurality of individuals associated with the vehicle and in a proportion based on a driving time of each individual of the plurality of individuals, the safe driving reward;
determine one of the plurality of individuals corresponding to the telematics data; and
display, in an interface and based on the one or more safe driving behaviors selected and the one or more unsafe driving behaviors selected;
an indication of a portion of the safe driving reward provided to the one of the plurality of individuals; and
a driving performance trend of the one of the plurality of individuals during operation of the vehicle, wherein the indication of the driving performance trend identifies strengths and weaknesses of the one of the plurality of individuals.

17. The system of claim 16, wherein the second instructions, when executed by the one or more second processors, further cause the safe driving evaluation device to:
determine, for each of the one or more safe driving behaviors, a safe driving score based at least in part, on a third comparison of the vehicle telematics data to a respective safe driving behavior, wherein determining the number of safe driving points comprises aggregating each safe driving score.

18. The system of claim 16, wherein the second instructions, when executed by the one or more second processors, further cause the safe driving evaluation device to:
determine, for each of the one or more unsafe driving behaviors, an unsafe driving score based, at least in part, on a fourth comparison of the vehicle telematics data to a respective unsafe driving behavior, wherein reducing the number of safe driving points comprises subtracting each unsafe driving score from the number of safe driving points.

19. The system of claim 16, wherein the second instructions, when executed by the one or more second processors, further cause the safe driving evaluation device to:
increment a total number of safe driving points associated with the individual by the number of safe driving points.

20. The system of claim 19, wherein the second instructions, when executed by the one or more second processors, further cause the safe driving evaluation device to:
determine a safe driving reward amount based, at least in part, on a fifth comparison of the total number of safe driving points associated with the individual to one or more rewards thresholds.

* * * * *